US012803622B2

(12) United States Patent
Lee et al.

(10) Patent No.: US 12,803,622 B2
(45) Date of Patent: Nov. 17, 2026

(54) BASE STATION FOR RECONSTRUCTING DOWNLINK CHANNEL IN MULTI-INPUT-MULTI-OUTPUT COMMUNICATION SYSTEM, AND DOWNLINK CHANNEL RECONSTRUCTION METHOD THROUGH BASE STATION

(71) Applicant: KOREA UNIVERSITY RESEARCH AND BUSINESS FOUNDATION, Seoul (KR)

(72) Inventors: Nam Yoon Lee, Seoul (KR); Deokhwan Han, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 117 days.

(21) Appl. No.: 18/747,946

(22) Filed: Jun. 19, 2024

(65) Prior Publication Data

US 2024/0421863 A1 Dec. 19, 2024

(30) Foreign Application Priority Data

Jun. 19, 2023 (KR) ........................ 10-2023-0078018

(51) Int. Cl.
*H04W 72/21* (2023.01)
*H04B 7/0413* (2017.01)
(Continued)

(52) U.S. Cl.
CPC ......... *H04B 7/0413* (2013.01); *H04L 5/0048* (2013.01); *H04W 72/1273* (2013.01); *H04W 72/21* (2023.01); *H04W 72/54* (2023.01)

(58) Field of Classification Search
CPC .... H04B 7/0413; H04L 5/0048; H04W 72/21; H04W 72/54; H04W 72/1273
See application file for complete search history.

(56) References Cited

U.S. PATENT DOCUMENTS

2016/0337011 A1* 11/2016 Ying .................... H04B 7/0413
2019/0123948 A1* 4/2019 Zhao .................... H04B 7/0452
(Continued)

FOREIGN PATENT DOCUMENTS

KR 10-2009-0074825 A 7/2009
KR 10-2014-0121541 A 10/2014
(Continued)

OTHER PUBLICATIONS

Deokhwan Han et al., "FDD Massive MIMO Without CSI Feedback," arXiv:2302.04398v1 [cs.IT], Feb. 9, 2023 (30 pages).
(Continued)

*Primary Examiner* — Syed Haider
(74) *Attorney, Agent, or Firm* — Hauptman Ham, LLP

(57) ABSTRACT

A method of reconstructing a downlink (DL) channel by a base station in a multiple-input-multiple-output (MIMO) communication system includes: estimating UL channel information on the basis of an uplink (UL) pilot signal received from a user equipment; extracting at least one key parameter among common parameters of the UL channel and the DL channel from the estimated UL channel information; estimating DL channel information using the UL channel information and the at least one key parameter; and reconstructing the DL channel by correcting an error between the estimated DL channel information and actual DL channel information.

10 Claims, 11 Drawing Sheets

(51) Int. Cl.

| | |
|---|---|
| ***H04L 5/00*** | (2006.01) |
| ***H04W 72/1273*** | (2023.01) |
| ***H04W 72/54*** | (2023.01) |

(56) References Cited

U.S. PATENT DOCUMENTS

| | | | | |
|---|---|---|---|---|
| 2021/0314035 A1* | 10/2021 | Jin | | H04B 17/364 |
| 2022/0224388 A1* | 7/2022 | Choi | | H04W 72/23 |
| 2023/0085924 A1* | 3/2023 | Li | | H04L 25/0224<br>370/252 |

FOREIGN PATENT DOCUMENTS

| | | | |
|---|---|---|---|
| KR | 10-2015-0054651 | A | 5/2015 |
| KR | 10-2021-0037240 | A | 4/2021 |
| KR | 10-2021-0141143 | A | 11/2021 |
| KR | 10-2022-0010435 | A | 1/2022 |
| KR | 10-2023-0011374 | A | 1/2023 |

OTHER PUBLICATIONS

Office Action dated Jul. 8, 2024 for corresponding Korean Patent Application No. 10-2023-0078018, along with an English machine translation (12 pages).

* cited by examiner

BASE STATION FOR RECONSTRUCTING DOWNLINK CHANNEL IN MULTI-INPUT-MULTI-OUTPUT COMMUNICATION SYSTEM, AND DOWNLINK CHANNEL RECONSTRUCTION METHOD THROUGH BASE STATION

CROSS-REFERENCE TO RELATED APPLICATION(S)

The present application claims the benefit of priority to Korean Patent Application No. 10-2023-0078018 filed on Jun. 19, 2023, in the Korean Intellectual Property Office. The aforementioned application is hereby incorporated by reference in its entirety.

BACKGROUND OF THE INVENTION

Field of the Invention

The present invention relates to downlink (DL) channel reconstruction, and more specifically, to a base station for reconstructing a DL channel using an uplink (UL) signal in a multiple-input-multiple-output (MIMO) communication system.

Background of the Related Art

The Massive MIMO communication technique is one of promising techniques for achieving high frequency efficiency of future cellular networks. As channel reciprocity, which is an important characteristic of Time-Division-Duplexing (TDD) systems, allows a base station to acquire DL channel information without additional training or a feedback process for channel estimation, significant gains can be obtained in energy frequency efficiency. However, in a Frequency-Division-Duplexing (FDD) system, additional training and a feedback process are required for channel estimation due to the incompatible characteristic of DL channels and UL channels. This generates a problem of limiting the efficiency of frequency in FDD-based massive MIMO systems.

Accordingly, researches are under progress in various fields to solve the problem of overheads increased due to channel feedback. Representative examples thereof include a Compressive Sensing (CS) technique, a two-step precoding technique using channel space correlation, and extrapolation of DL channel information using a UL channel. Among these techniques, extrapolation of DL channel information is a technique for estimating DL channel information using UL pilot signals and is spotlighted as a promising technique that can completely eliminate a significant amount of overhead associated with DL channel training and feedback. However, as channel reciprocity is insufficient in the FDD system environment, it is very difficult to accurately estimate DL channel information using the UL pilot.

Accordingly, a method of accurately estimating DL channel information without separate feedback information needs to be provided.

SUMMARY OF THE INVENTION

Therefore, the present invention has been made in view of the above problems, and it is an object of the present invention to provide a method and device for reconstructing a DL channel without separate feedback information using a UL signal in a MIMO communication system.

To accomplish the above object, according to one aspect of the present invention, there is provided a method of reconstructing a downlink (DL) channel by a base station in a multiple-input-multiple-output (MIMO) communication system, the method comprising the steps of: estimating UL channel information on the basis of an uplink (UL) pilot signal received from a user equipment; extracting at least one key parameter among common parameters of the UL channel and the DL channel from the estimated UL channel information; estimating DL channel information using the UL channel information and the at least one key parameter; and reconstructing the DL channel by correcting an error between the estimated DL channel information and actual DL channel information.

To accomplish the above object, according to another aspect of the present invention, there is provided a base station for reconstructing a downlink (DL) channel in a multiple-input-multiple-output (MIMO) communication system, the base station comprising: a reception unit for receiving an uplink (UL) pilot signal transmitted from a user equipment; a UL channel information estimation unit for estimating UL channel information on the basis of the received UL pilot signal; a parameter extraction unit for extracting at least one key parameter among common parameters of the UL channel and the DL channel from the estimated UL channel information; a DL channel information estimation unit for estimating DL channel information using the UL channel information and the at least one key parameter; and a DL channel reconstruction unit for reconstructing the DL channel by correcting an error between the estimated DL channel information and actual DL channel information.

DETAILED DESCRIPTION OF THE PREFERRED EMBODIMENT

Figure 1:
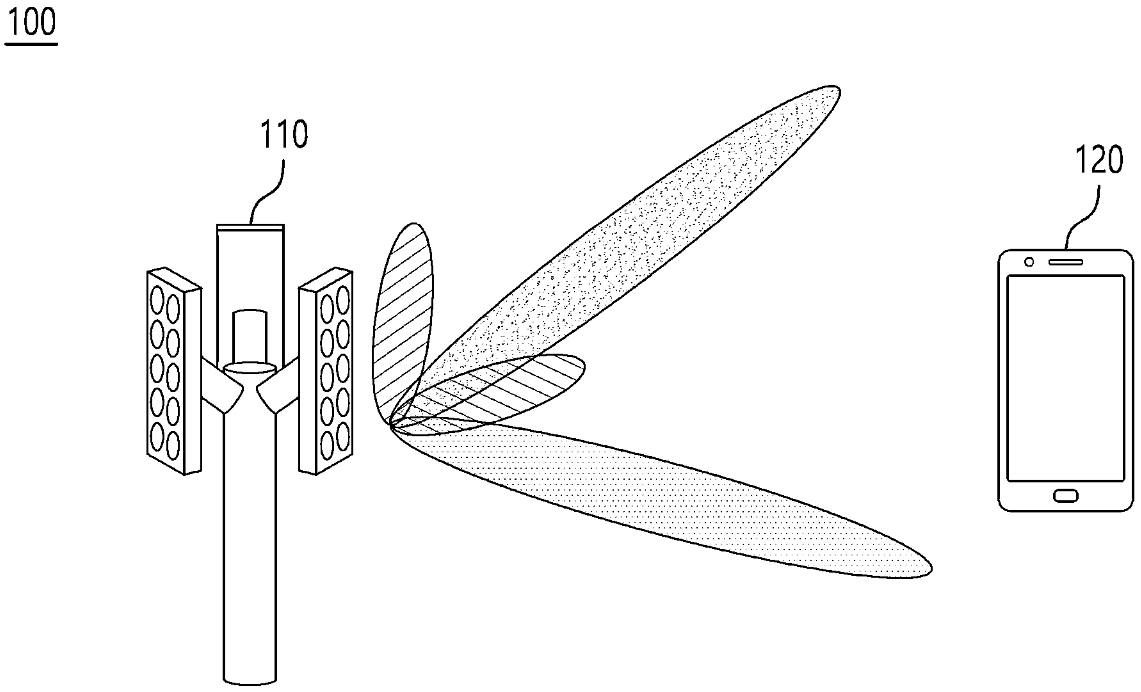
FIG. 1 is a view showing an example of a MIMO communication system according to an embodiment of the present invention.

The detailed description of the present invention is described below with reference to the accompanying drawings, which shows, as an example, specific embodiments in which the present invention may be embodied. These embodiments are described in detail as sufficient as to embody the present invention by those skilled in the art. It should be understood that although the various embodiments of the present invention are different from one another, they are not necessarily mutually exclusive. For example, specific shapes, structures and characteristics described herein may be implemented in other embodiments without departing from the spirit and scope of the present invention in relation to an embodiment. In addition, it should be understood that the location or arrangement of individual components within each disclosed embodiment may be changed without departing from the spirit and scope of the present invention. Accordingly, the detailed description described below is not intended to be taken in a limiting sense, and the scope of the present invention is limited, if properly described, only by the appended claims, together with all the scopes equivalent to those claimed in the claims. In the drawings, similar reference numerals refer to identical or similar functions across several aspects.

Components according to the present invention are components defined not by physical classification but by functional classification, and may be defined by the functions performed by each component. Each component may be implemented as hardware or program codes and processing units (or processors) that perform respective functions, and functions of two or more components may be implemented to be included in one component. Therefore, the names given to the components in the following embodiments are not to physically distinguish each component, but to imply a representative function performed by each component, and it should be noted that the technical spirit of the present invention is not limited by the names of the components.

Hereinafter, preferred embodiments of the present invention will be described in more detail with reference to the drawings.

FIG. 1 is a view showing an example of a MIMO communication system according to an embodiment of the present invention.

Referring to FIG. 1, a MIMO communication system 100 includes a base station 110 and a user equipment (UE) 120.

The UE 120 transmits a UL pilot signal to the base station 110, and the base station 110 receives the UL pilot signal and estimates UL channel information.

The base station 110 extracts at least one key parameter among common parameters of the UL and DL channels from the estimated UL channel information, and estimates DL channel information using the estimated UL channel information and the extracted at least one key parameter.

Thereafter, the base station 110 reconstructs DL channel information by correcting the error between the estimated DL channel information and actual DL channel information, performs DL precoding on the signal to be transmitted using the reconstructed DL channel information, and transmits the pre-coded DL signal to the UE 120.

Figure 2:
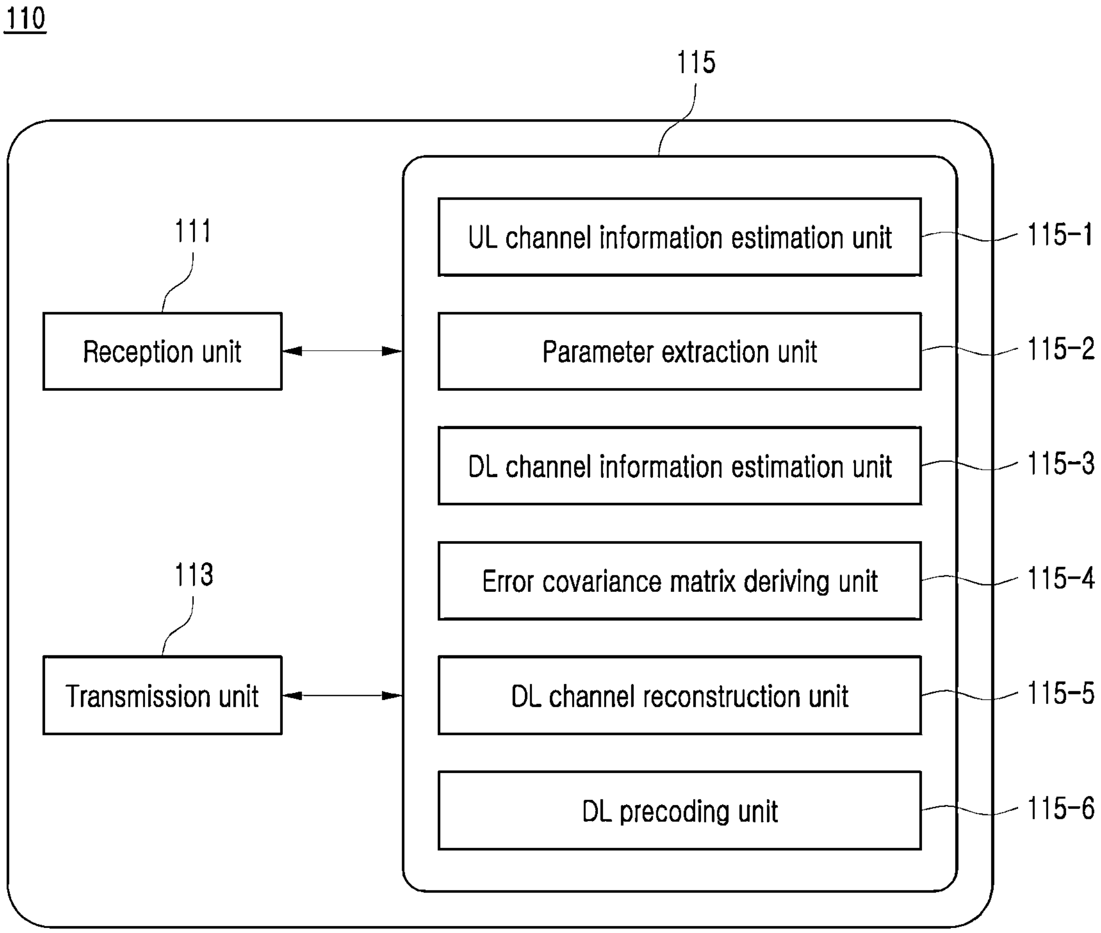
FIG. 2 is a block diagram showing internal blocks of a base station for reconstructing a DL channel in a MIMO communication system according to an embodiment of the present invention.

FIG. 2 is a block diagram showing internal blocks of a base station for reconstructing a DL channel in a MIMO communication system according to an embodiment of the present invention.

Referring to FIG. 2, the base station 110 includes a reception unit 111, a transmission unit 113, and a control unit 115, and the control unit 115 is configured of a UL channel information estimation unit 115-1, a parameter extraction unit 115-2, a DL channel information estimation unit 115-3, an error covariance matrix deriving unit 115-4, a DL channel reconstruction unit 115-5, and a DL precoding unit 115-6. In some embodiments, each of the reception unit and the transmission unit comprises hardware circuitry (e.g., a transceiver circuit, or a network interface circuit) configured to perform one or more functions and/or operations as described herein. In some embodiments, each of the control unit 115, the UL channel information estimation unit 115-1, the parameter extraction unit 115-2, the DL channel information estimation unit 115-3, the error covariance matrix deriving unit 115-4, the DL channel reconstruction unit 115-5, and the DL precoding unit 115-6 comprises hardware circuitry configured to perform one or more functions and/or operations as described herein. For example, the control unit comprises a processor, and each of the UL channel information estimation unit 115-1, the parameter extraction unit the DL channel information estimation unit 115-3, the error covariance matrix deriving unit 115-4, the DL channel reconstruction unit 115-5, and the DL precoding unit 115-6 comprises one or more parts of the processor configured to perform one or more functions and/or operations as described herein.

The reception unit 111 of the base station 110 receives a UL pilot transmitted from the UE, and the UL channel information estimation unit 115-1 estimates UL channel information on the basis of the received UL pilot.

The parameter extraction unit 115-2 extracts at least one key parameter among common parameters of the UL and DL channels, e.g., Angle of Departure (AoD)/Angle of Arrival (AoA) parameter θk and channel path attenuation parameter $b_k$, from the UL channel information $$\hat{h}_k^{ul}$$

estimated by the UL channel information estimation unit 115-1.

The DL channel information estimation unit 115-3 estimates DL channel information using at least one among the UL channel information $$\hat{h}_k^{ul}$$

estimated by the UL channel information estimation unit 115-1 and the angle of departure/arrival parameter θk and the channel path attenuation parameter $b_k$ extracted by the parameter extraction unit 115-2. At this point, the DL channel information estimation unit 115-3 may estimate the DL channel information by applying a Minimum Mean Square Error (MMSE) method or a Linear-Minimum Mean Square Error (L-MMSE) method. At this point, both the angle of departure/arrival parameter θk and the channel path attenuation parameter $b_k$ are used in DL channel estimation based on the MMSE method, and only the angle of departure/arrival parameter θk is used in DL channel estimation based on the L-MMSE method.

The error covariance matrix deriving unit 115-4 derives an error covariance matrix for error correction between the estimated DL channel information and the actual DL channel information. Thereafter, the DL channel reconstruction unit 115-5 reconstructs the DL channel by applying the error covariance matrix $\Phi_k$ derived by the error covariance matrix deriving unit 115-4 to the DL channel information estimated by the DL channel information estimation unit 115-3.

Thereafter, the DL precoding unit 115-6 performs DL precoding on the signal to be transmitted using the DL channel information reconstructed by the DL channel reconstruction unit 115-5, and transmits the pre-coded DL signal to the UE through the transmission unit 113.

Hereinafter, the DL channel reconstruction operation of the base station described in FIG. 2 will be described in more detail through mathematical equations.

The UL channel from user $k \in [K]$ to the base station is as follows. Assuming a uniform linear array (ULA) antenna element at the base station in the case where $$h_k^{ul}$$

is a UL channel defined as the sum of array response vectors, the narrowband UL channel model may be expressed as shown in Equation 1.

$$h_k^{ul} = \sum_{l=1}^{L_k^{ul}} g_{k,l}^{ul} \alpha(\theta_{k,l}^{ul}, \lambda^{ul}) \quad \text{[Equation 1]}$$

Here, $$L_k^{ul} \in Z^+$$

represents the number of multiple paths for each fading, and $$g_{k,l}^{ul} \in \mathbb{C}$$

represents the complex coefficient. Under the assumption of a long distance, the array response vector is defined by the angle of arrival $$\theta_{k,l}^{ul}$$

as shown in Equation 2.

$$\alpha(\theta_{k,l}^{ul}, \lambda^{ul}) = \left[1, e^{-j\frac{2\pi}{\lambda^{ul}} d \sin\theta_{k,l}^{ul}}, \ldots, e^{-j\frac{2\pi}{\lambda^{ul}}(N-1) d \sin\theta_{k,l}^{ul}}\right] \quad \text{[Equation 2]}$$

Here, $\lambda^{ul}$ represents the wavelength corresponding to UL, and d represents the distance of antennas. The narrowband channel constant for traveling the $\ell$-th path is given as shown in Equation 3.

$$g_{k,l}^{ul} = b_{k,l}^{ul} e^{-j\frac{2\pi}{\lambda^{ul}} r_{k,l} + \phi^{ul}} \quad \text{[Equation 3]}$$

Here, $$b_{l,k}^{ul} \in \mathbb{R}^+$$

represents the $\ell$-th path attenuation of the UL channel from user k to the base station, $r_{k,l}$ represents the distance of the path, $$\phi_{l,k}^{ul}$$

represents a random phase regardless of the wavelength, and the phase is uniformly distributed over [0.2π] to capture small-scale fading effects generated due to path reflection.

In a way similar to that of the UL channel model shown in Equation 1, the DL channel model from the base station to user k may be expressed as shown in Equation 4 by the sum of complex channel coefficient $$g_{k,l}^{dl}$$

representing the array phase profile and array response vector $$\alpha(\theta_{k,l}^{dl}, \lambda^{dl})$$

corresponding to the angle of departure (AoD)

$$\theta_{k,l}^{dl}.$$

$$h_k^{dl} = \sum_{l=1}^{L_k^{dl}} g_{k,l}^{dl} \alpha(\theta_{k,l}^{dl}, \lambda^{di}) \quad \text{[Equation 4]}$$

Here, $$L_k^{dl} \in Z^+$$

represents the number of multiple paths for each fading, and $$g_{k,l}^{dl} \in \mathbb{C}$$

represents the complex coefficient. Under the assumption of a long distance, the array response vector is defined by the angle of departure $$\theta_{k,l}^{dl}$$

as shown in Equation 5.

$$\alpha(\theta^{d}_{k,l}, \lambda^{dl}) = \left[1, e^{-j\frac{2\pi}{\lambda^{dl}}dsin\theta^{dl}_{k,l}}, \ldots, e^{-j\frac{2\pi}{\lambda^{dl}}(N-1)dsin\theta^{dl}_{k,l}}\right] \quad \text{[Equation 5]}$$

Here, $\lambda^{dl}$ means the wavelength corresponding to DL. The narrowband channel constant of traveling the $\ell$-th path is given as shown in Equation 6.

$$g^{dl}_{k,l} = b^{dl}_{k,l} e^{-j\frac{2\pi}{\lambda^{dl}}r_{k,l}+\phi^{dl}} \quad \text{[Equation 6]}$$

Here, $$b^{dl}_{l,k}$$

represents the $\ell$-th path attenuation of the DL channel from the base station to user k, $r_{k,l}$ represents the distance of the path, $$\phi^{dl}_{l,k}$$

represents a random phase regardless of the wavelength, and the phase is uniformly distributed over [0.2π] to capture small-scale fading effects generated due to path reflection.

The simplified single cluster channel model expressed in Equations 1 and 4 captures the scattering effect of diffuse reflection in the cluster through several paths. The channel model proposed in the present invention assumes that a cluster has several dominant paths which show a macro-level channel propagation effect as the angular spread is concentrated at the angles of departure and arrival in each path. In particular, the channel model proposed in the present invention has been empirically proved as being accurate at high frequencies where the scattering effect from diffuse reflection is low.

Meanwhile, UL and DL channels operating at different wavelengths, i.e., $\lambda^{ul}$ and $\lambda^{dl}$, are lack of reciprocity since channel coefficients $$g^{ul}_{k,l}$$

and $$g^{dl}_{k,l}$$

and array response vectors $$\alpha(\theta^{ul}_{k,l}, \lambda^{ul})$$

and $$\alpha(\theta^{dl}_{k,,}, \lambda^{dl})$$

vary according to the wavelength. However, some key parameters among the geometric parameters commonly used in the UL and DL channels have a frequency-independent characteristic of not being changed according to the frequency. The frequency-invariant parameters are described below.

Angle of arrival parameter $$\theta^{ul}_{k,l}$$

and angle of departure parameter $$\theta^{dl}_{k,l}:$$

These are basic parameters of wave propagation, and these parameters are assumed to be equal due to the inherent symmetry of antenna path geometry.

Channel path attenuation parameters $$b^{ul}_{l,k} \in \mathbb{R}^+$$

and $$b^{dl}_{l,k} \in \mathbb{R}^+:$$

They generally depend on the frequency, which are path loss of an omnidirectional antenna and modeled as shown in Equation 7.

$$-10\log b^{ul}_{k,l} = 20\log\left(\frac{4\pi r_0}{\lambda^{ul}} + m\log\left(\frac{r_{k,l}}{r_0}\right) + X_{k,l}\right) \quad \text{[Equation 7]}$$

Here, parameter $r_0$ represents the reference distance, m represents the path loss index, and $X_{k,l}$ represents the shadowing effect. As the distance of path $r_{k,l}$ is shared between the UL and DL channels, the dominant term $$m\log\left(\frac{r_{k,l}}{r_0}\right)$$

will be the same between the two channels. Therefore, the path attenuation terms of UL and DL are considered as being frequency-invariant.

Phase variation parameters $$\phi^{ul}_{l,k}$$

and $$\phi^{dl}_{l,k}:$$

They are generated in a phenomenon such as reflection or refraction, and consequently, these parameters are consistent between UL and DL unless the physical environment changes.

As described above, in the embodiment of the present invention, the DL channel is reconstructed through the UL pilot signal by utilizing these frequency-invariant parameters. In the embodiment of the present invention described below, the UL and DL will not be distinguished with respect to each parameter for convenience of explanation. That is, the angles of departure and arrival are simplified as $$\theta_{k,l} = \theta_{k,l}^{ul} = \theta_{k,l}^{dl},$$

and it will be applied to path attenuation $$b_{k,l} = b_{k,l}^{ul} = b_{k,l}^{dl}$$

and phase variation $$\phi_{k,l} = \phi_{k,l}^{ul} = \theta_{k,l}^{dl}$$

in the same way. In addition, it is assumed that the number of channel paths of UL and DL is the same, i.e., $$L_k = L_k^{ul} = L_k^{dl}.$$

Next, in an embodiment of the present invention, the MSE optimal channel reconstruction algorithm for the DL channel will be described assuming perfect knowledge of the UL channel $$h_k^{ul}$$

and the frequency-invariant channel parameter $$\{\theta_{k,l}, b_{k,l}\}_{l=1}^{L_n}$$

of each user. In an embodiment of the present invention described below, the effect of incomplete knowledge and parameters of the UL channel on the DL channel performance will be shown in a simulation result. In addition, the DL channel reconstruction error covariance matrix is additionally analyzed to quantify the accuracy of DL channel reconstruction as a function of UL and DL carrier frequencies.

When it is assumed that the phases of the UL and DL channel paths are uniformly distributed, i.e., when $$\angle g_{k,l}^{ul} = \frac{2\pi}{\lambda^{ul}} r_{k,l} - \phi_{k,l} \in \lfloor 0, 2\pi) \forall\, l \in L_k \text{ and}$$

$$\angle g_{k,l}^{dl} = \frac{2\pi}{\lambda^{dl}} r_{k,l} - \phi_{k,l} \in \lfloor 0, 2\pi) \forall\, l \in L_k,$$

the correlation between $$g_k^{ul}$$

and $$g_k^{dl}$$

conditioned on $\{b_{k,l}, \ldots b_{k,L_n}\}$ is given as shown in Equation 8.

$$\mathbb{E}\lfloor g^{dl}(g^{ul})^H \rfloor = \eta\Sigma_k, \forall_k \in \lfloor K \rfloor \quad \text{[Equation 8]}$$

Here, $\Sigma_k = \text{diag}([b_{k,1}^2, \ldots, b_{k,L_k}]),$ $$\text{and} \quad \eta = \frac{1}{2\pi\left(\frac{\lambda^{ul}}{\lambda^{dl}} - 1\right)}\left(\sin\left(2\pi\frac{\lambda^{ul}}{\lambda^{dl}}\right) - 2j\sin^2\left(\pi\frac{\lambda^{ul}}{\lambda^{dl}}\right)\right).$$

In Equation 8, the correlation matrix $\eta\Sigma_k$ means the $\eta$-scaled channel path attenuation matrix $\Sigma_k$, and $\eta$ represents the scaling parameter. To understand the effect of $\eta$, the operation according to the change in the carrier frequency gap between UL and DL should be analyzed. For example, since $\eta=1$ when the carrier frequencies of UL and DL are the same, the correlation is simplified as the channel attenuation matrix $\Sigma_k$, and in the opposite case, $\eta$ reflects the carrier frequency deviation at a ratio of $$\frac{\lambda^{ul}}{\lambda^{dl}}.$$

Using these characteristics, the DL channel may be reconstructed through utilization of UL channel information and partial geometric parameters. In the embodiment of the present invention, it is assumed that the base station has perfect knowledge of the UL channel information and the partial geometric parameters, and this is expressed as $$\left\{h_k^{ul}, \theta_k, \sum\nolimits_k\right\}.$$

Equation 9 shown below defines DL channel estimation based on the MMSE method using $$\left\{h_k^{ul}, \theta_k, \sum\nolimits_k\right\}.$$

$$\hat{h}_k^{dl.MMSE} = \eta A_k^{dl} \Sigma_k^{\frac{1}{2}} \left(\Sigma_k^{-\frac{1}{2}} \left(A_k^{ul}\right)^{\dagger} h_k^{ul}\right)^{\frac{\lambda^{ul}}{\lambda^{dl}}} \quad \text{[Equation 9]}$$

Here, $$A_k^{ul}=\left[\alpha(\theta_{k,l},\lambda^{ul}),\ \dots\ ,\alpha(\theta_{k,L_k},\lambda^{ul})\right]\in\mathbb{C}^{N\times L_k}$$

means the array response matrix of UL, and $$A_k^{dl}=\left[\alpha(\theta_{k,l}\lambda^{dl}),\ \dots\ ,\alpha(\theta_{k,L_k},\lambda^{dl})\right]\in\mathbb{C}^{N\times L_k}$$

means the array response matrix of DL. The MMSE-based DL channel estimation value shown in Equation 9 is derived from a combination of four factors described below. That is, the MMSE-based DL channel estimation value is derived from a combination of UL channel information $$h_k^{ul},$$

a UL array response matrix $$A_k^{ul}$$

defined by the angle of arrival parameter, the correlation matrix $\eta\Sigma_k$ described in Equation 8, and a DL array response matrix $$A_k^{dl}$$

defined by the angle of departure parameter.

The MMSE-based DL channel estimation process starts from estimation of UL channel $$h_k^{ul}$$

and goes through transformation using $$\Sigma_k^{-\frac{1}{2}}\left(A_k^{ul}\right)^{\dagger}$$

and index $$\frac{\lambda^{ul}}{\lambda^{dl}}.$$

Finally, the DL channel estimation value is obtained by multiplication with the normalization matrix and projection onto the DL array matrix $$\eta A_k^{dl}\Sigma_k^{\frac{1}{2}}.$$

Equation 10 shown below defines DL channel estimation based on the L-MMSE method.

$$\hat{h}_k^{dl.MMSE}=\text{Re}\{\eta\}A_k^{dl}\left(A_k^{ul}\right)^{\dagger}h_k^{ul} \quad \text{[Equation 10]}$$

Here, it indicates $$\text{Re}\{\eta\}=\frac{1}{2\pi\left(\frac{\lambda^{ul}}{\lambda^{dl}}-1\right)}\sin\left(2\pi\frac{\lambda^{ul}}{\lambda^{dl}}\right).$$

Since the DL channel estimation method based on L-MMSE requires information on the UL array response matrix $$A_k^{ul},$$

the DL array response matrix $$A_k^{dl},$$

the real part Re{η} of the carrier normalization constant, and the UL channel information $$h_k^{ul},$$

it is different from the DL channel estimation method based MMSE shown in Equation 9. However, since the L-MMSE estimation does not require the channel path attenuation matrix $\Sigma_k$, the DL channel reconstruction process may be further simplified. In addition, in the L-MMSE estimation, the real part of η in Equation 8 is used for carrier normalization.

To evaluate precision of DL channel reconstruction, MSE performance of the DL channel reconstruction method proposed in Equation 9 and Equation 10 is evaluated as follows. First, the MSE matrix of each estimator is configured, and an MSE value is derived using the MSE matrix. When $$e_k=h_k^{dl}-\hat{h}_k^{dl.MMSE}$$

is defined as the DL channel reconstruction error, the error covariance matrix having knowledge of $$\left\{h_k^{ul},\theta_k,\sum\nolimits_k\right\}$$

may be expressed as shown in Equation 11.

$$\Phi_k^{MMSE}=\mathbb{E}\left[e_ke_k^H\middle|h_k^{ul},\theta_k,\Sigma_k\right]=\left(1-|\eta|^2\right)A_k^{dl}\Sigma_k\left(A_k^{dl}\right)^H \quad \text{[Equation 11]}$$

In addition, when the L-MMSE-based DL channel reconstruction method of Equation 10 is used in the case where $$\tilde{e}_k = h_k^{dl} - \hat{h}_k^{dl,L\text{-}MMSE},$$

the error covariance matrix may be expressed as shown in Equation 12.

$$\Phi_k^{L\text{-}MMSE} = \mathbb{E}\left[\tilde{e}_k \tilde{e}_k^H \middle| h_k^{ul}, \theta_k, \Sigma_k\right] = \left(1 - \mathrm{Re}|\eta|^2\right) A_k^{dl} \Sigma_k \left(A_k^{dl}\right)^H \quad \text{[Equation 12]}$$

Through Equation 11 and Equation 12, it can be seen that the MSE matrix is affected by two factors, i.e., the DL array response matrix $$A_k^{dl}$$

and the correlation matrix $\eta\Sigma_k$ of the UL and DL paths specified in Equation 8. At this point, it should be noted that the MSE matrix varies on the basis of the frequency ratio $$\frac{\lambda^{ul}}{\lambda^{dl}}$$

of UL and DL shown in Equation 8. To further understand the effect, an asymptotic MSE value for the DL channel reconstruction algorithm proposed according to Equation 13 and Equation 14 may be calculated.

$$MSE = \lim_{N\to\infty} \frac{1}{N} \frac{Tr\left[\Phi_k^{MMSE}\right]}{Tr[\Sigma_k]} = 1 - |\eta|^2 \quad \text{[Equation 13]}$$

$$L - MSE = \lim_{N\to\infty} \frac{1}{N} \frac{Tr\left[\Phi_k^{L\text{-}MMSE}\right]}{Tr[\Sigma_k]} = 1 - \mathrm{Re}\{\eta\}^2 \quad \text{[Equation 14]}$$

Equation 13 and Equation 14 show that both MSE and L-MSE are deteriorated as the frequency gap increases.

Figure 3:
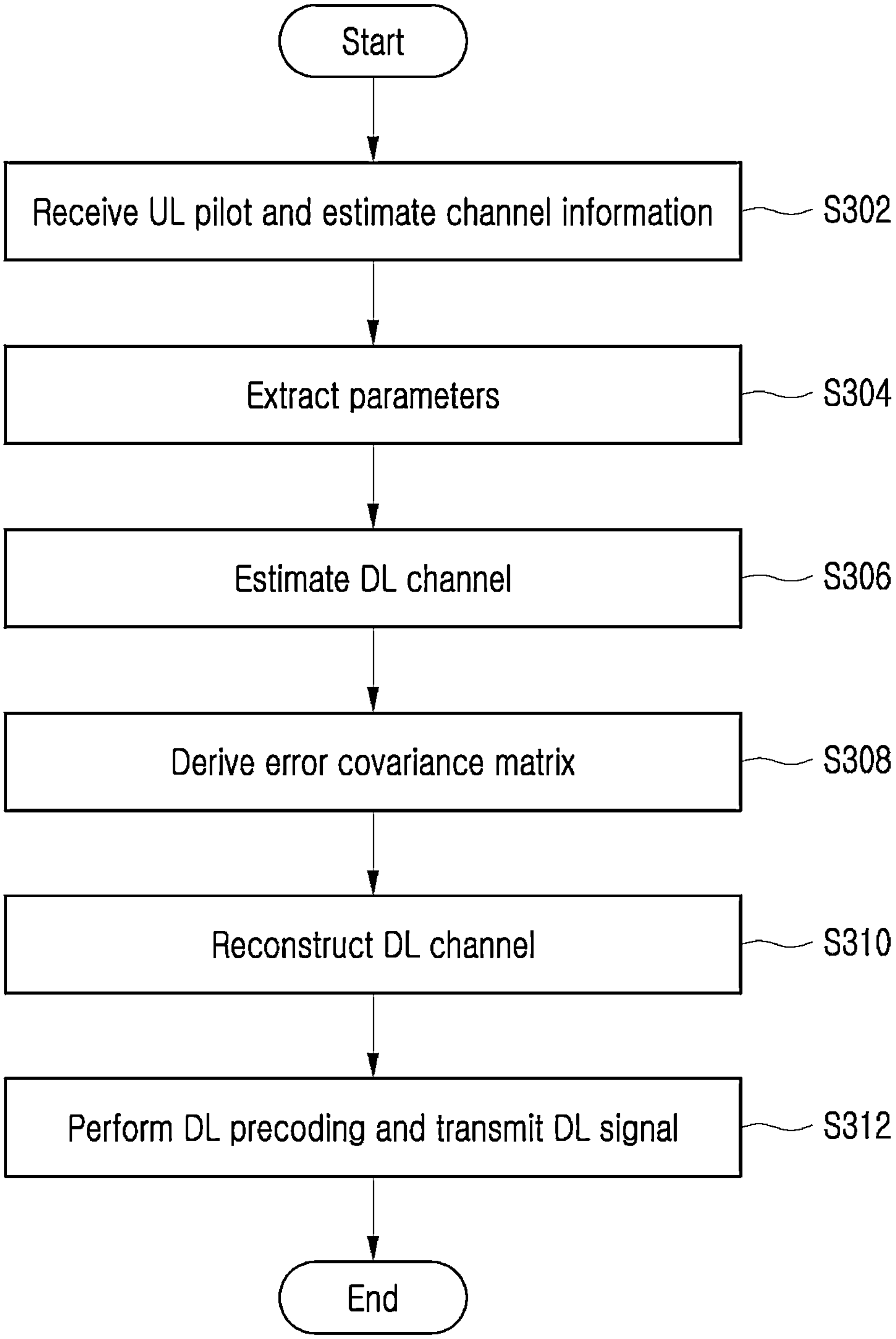
FIG. 3 is a flowchart illustrating a DL channel reconstruction operation of a base station in a MIMO communication system according to an embodiment of the present invention.

FIG. 3 is a flowchart illustrating a DL channel reconstruction operation of a base station in a MIMO communication system according to an embodiment of the present invention.

Referring to FIG. 3, at S302, the base station receives a UL pilot from the UE, estimates a UL channel on the basis of the received UL pilot, and proceeds to S304.

At S304, the base station extracts at least one key parameter having a frequency-independent characteristic, for example, an angle of departure/arrival parameter and a channel path attenuation parameter, among the common parameters of the UL and DL channels from the UL channel information estimated at S302, and proceeds to S306.

At S306, the base station estimates a DL channel using the UL channel information estimated at S302 and at least one key parameter extracted at S304, and proceeds to S308. At S308, the base station derives an error covariance matrix for error correction between the DL channel estimated at S306 and the actual DL channel, and proceeds to S310.

At S310, the base station reconstructs the DL channel by applying the error covariance matrix derived at S308 to the DL channel estimated at S306, and proceeds to S312.

At S312, the base station performs DL precoding on the signal to be transmitted using the DL channel information reconstructed at S310, and transmits the pre-coded DL signal to the UE.

Figure 4:
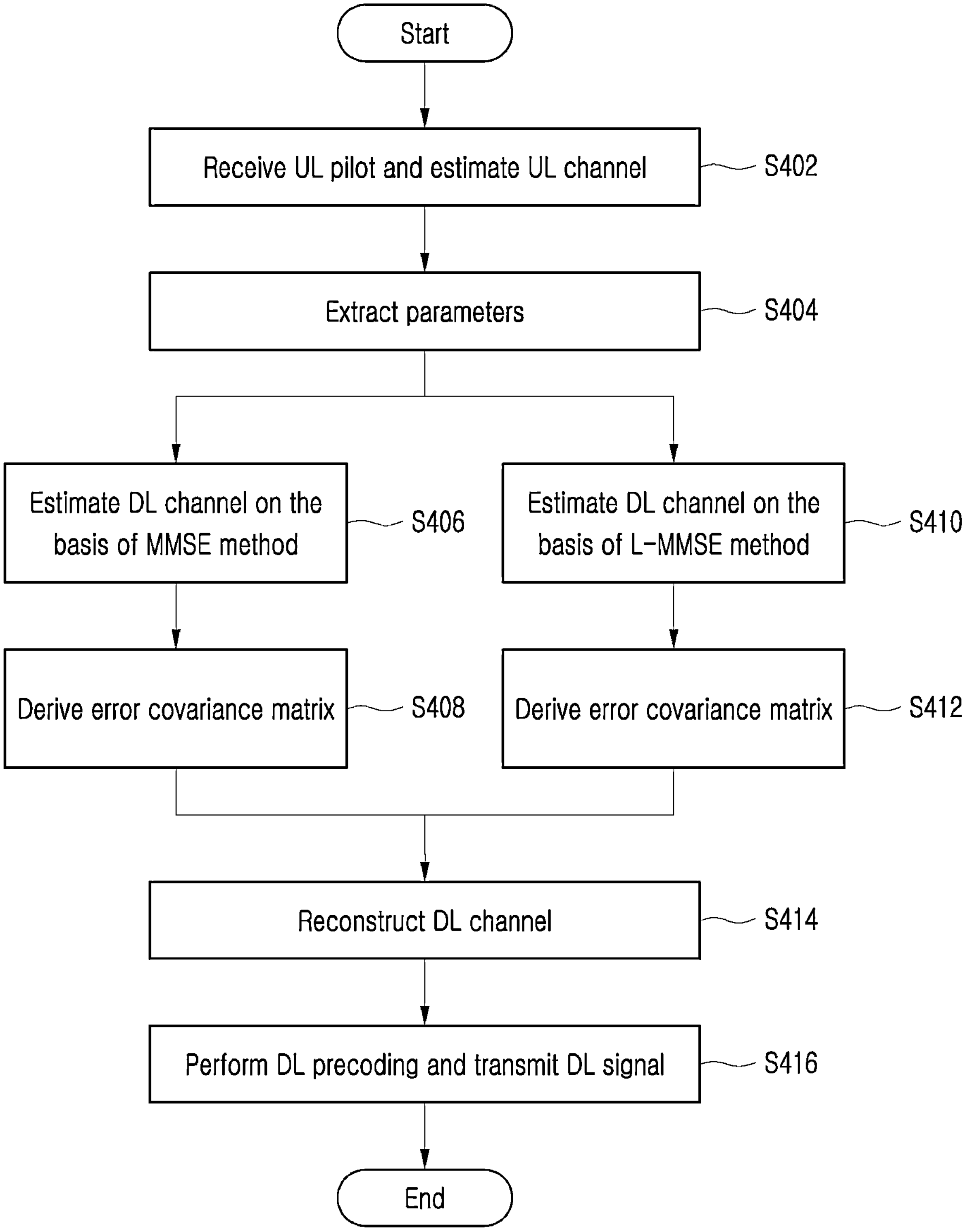
FIG. 4 is a flowchart illustrating a DL channel reconstruction operation of a base station in a MIMO communication system according to another embodiment of the present invention.

FIG. 4 is a flowchart illustrating a DL channel reconstruction operation of a base station in a MIMO communication system according to another embodiment of the present invention.

Referring to FIG. 4, at S402, the base station receives a UL pilot from the UE, estimates a UL channel on the basis of the received UL pilot, and proceeds to S404.

At S404, the base station extracts at least one key parameter having a frequency-independent characteristic, for example, an angle of departure/arrival parameter and a channel path attenuation parameter, among the common parameters of the UL and DL channels from the UL channel information estimated at S402.

Thereafter, when the base station estimates the DL channel by applying the MMSE, it proceeds to S406, estimates the DL channel by applying the MMSE method that uses the UL channel information estimated at S402 and the angle of departure/arrival parameter and the channel path attenuation parameter extracted at S404, and proceed to S408. At S408, the base station derives an error covariance matrix for error correction between the DL channel estimated at S406 and the actual DL channel, and proceeds to S414.

At S414, the base station reconstructs the DL channel by applying the error covariance matrix derived at S408 to the DL channel estimated at S406, and proceeds to S416.

Meanwhile, when the base station estimates the DL channel by applying the L-MMSE, it proceeds to S410, estimates the DL channel by applying the L-MMSE method that uses the UL channel information estimated at S402 and the angle of departure/arrival parameter extracted at S404, and proceed to S412. At S412, the base station derives an error covariance matrix for error correction between the DL channel estimated at S410 and the actual DL channel, and proceeds to S414.

At S414, the base station reconstructs the DL channel by using the DL channel estimated at S410 and the error covariance matrix derived at S412, and proceeds to S416.

At S416, the base station performs DL precoding on the signal to be transmitted using the DL channel information reconstructed at S414, and transmits the pre-coded DL signal to the UE.

Figure 5:
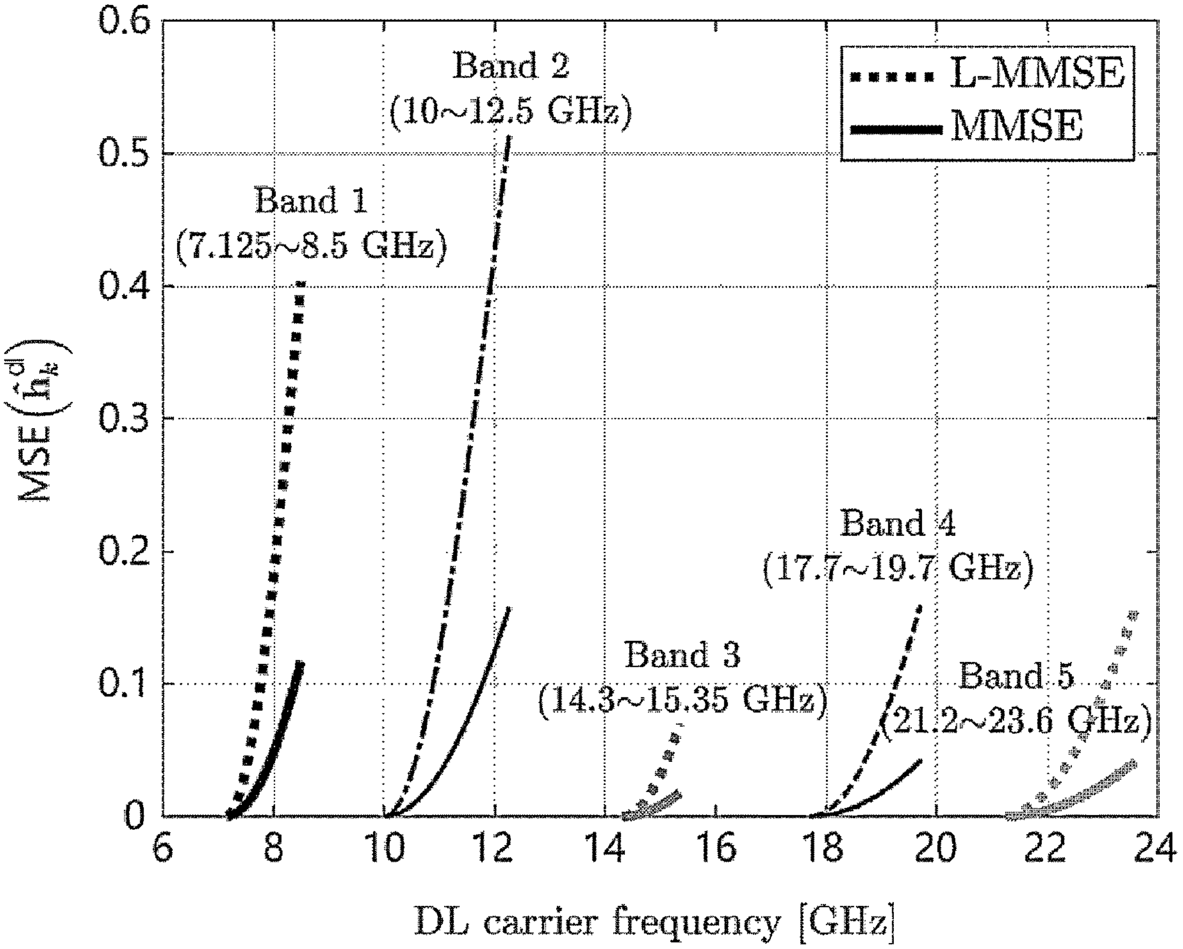
FIG. 5 is a graph showing MSE performance according to increase in the DL carrier frequency in upper-mid bands.

FIG. 5 is a graph showing MSE performance according to increase in the DL carrier frequency in upper-mid bands.

Referring to FIG. 5, the graph in the drawing shows both MMSE (shown as a solid line) and L-MMSE (shown as a dotted line) for different carrier frequencies in the upper-mid band, for example, the 7 to 23 GHz band. In the experiment, the UL carrier frequency is fixed to 7.125, 10, 14.3, 17.7, or 21.2 GHz, and the DL carrier frequency is changed from the UL carrier frequency value. The experiment result shows that both MMSE and L-MMSE increase according to the frequency gap, and this indicates that DL channel reconstruction using UL channel information is limited as the frequency gap increases.

Equation 15 shown below calculates the difference between L-MSE and MSE in regard to the carrier frequency ratio $$x = \frac{f_c^{ul}}{f_c^{dl}}.$$

$$\Delta MSE = |\eta|^2 - \mathrm{Re}\{\eta\}^2 = \frac{\sin^4(\pi\chi)}{\pi^2(1-\chi)^2} \quad \text{[Equation 15]}$$

Figure 6:
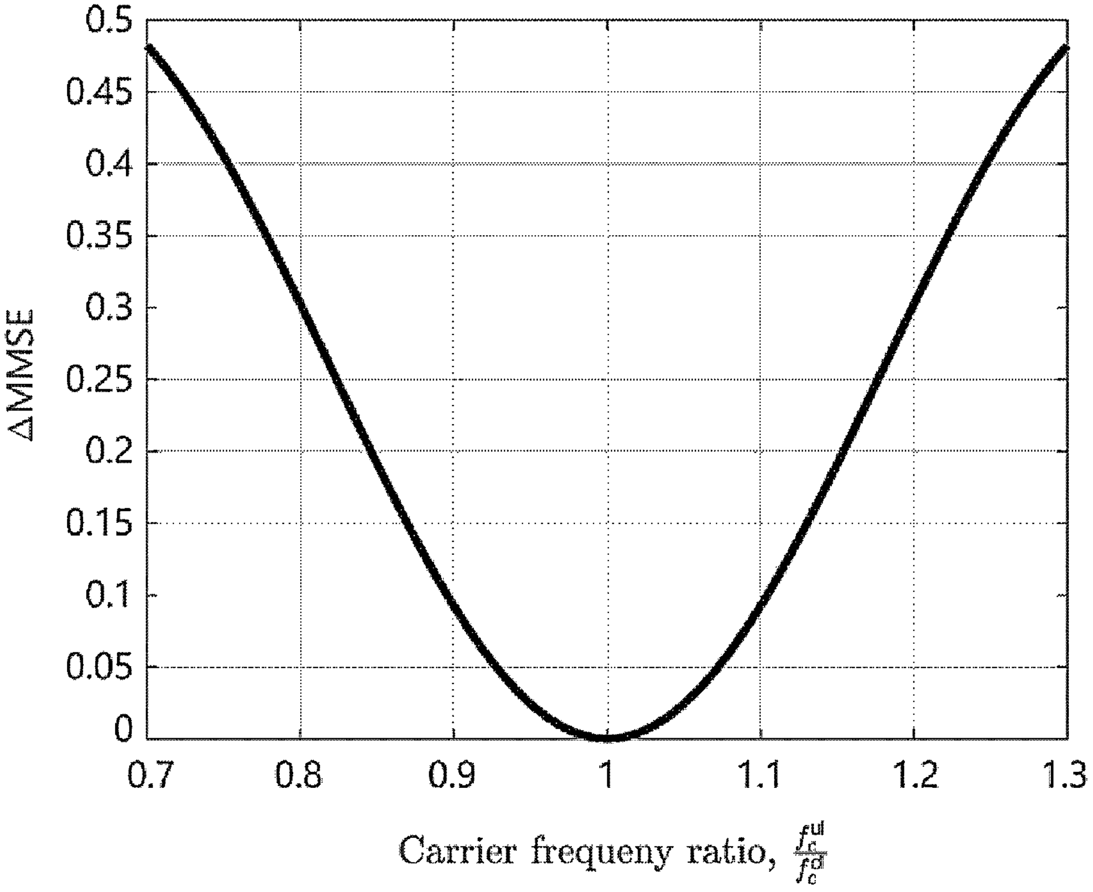
FIG. 6 is a graph showing a normalized MMSE interval between MMSE and L-MMSE channel estimators according to the carrier frequency ratio.

FIG. 6 is a graph showing a normalized MMSE interval between MMSE and L-MMSE channel estimators according to the carrier frequency ratio.

Referring to FIG. 6, the result shown in the graph indicates that the L-MMSE-based DL channel estimator slightly decreases the MMSE compared to the MMSE-based DL channel estimator within a frequency deviation of 10%

$$\left(0.9 \le \frac{f_c^{ul}}{f_c^{dl}} \le 1.1\right).$$

In practice, the observed deviation generally means that the DL channel reconstruction method can be implemented easily without greatly sacrificing performance when the L-MMSE-based DL channel estimator is used.

Hereinafter, the L-MMSE-based DL channel estimator derived in Equation 10 will be described. In the following description, it will be described by replacing $$\hat{h}_k^{dl,L\text{-}MMSE}$$

and $$\phi_k^{L\text{-}MMSE}$$

with $$\hat{h}_k^{dl}$$

and $\Phi_k$ for convenience of explanation.

In addition, in an embodiment of the present invention, a robust precoding algorithm that maximizes the sum-spectral efficiency by using a UL channel and a DL channel reconstructed from the MSE matrix will be described. The precoding algorithm begins with examining the sum-spectral efficiency maximization problem using incomplete channel information, and then presents a modified version that considers $$\hat{h}_k^{dl}$$

and $\Phi_k$ for robust DL precoding.

When the DL data symbol for user k is expressed as $s_k \in \mathbb{C}$ and the corresponding precoding vector is expressed as $f_k \in \mathbb{C}^{N\times 1}$, $s_k$ follows a complex Gaussian distribution having a mean of O and a variance of P under the assumption of a Gaussian signal.

$$x = \sum_{k=1}^{K} f_k s_k \quad \text{[Equation 16]}$$

At this point, the signal that user k receives may be expressed as shown in Equation 17.

$$y_k = \left(h_k^{dl}\right)^H f_k s_k + \left(h_k^{dl}\right)^H \Sigma_{i\neq k} f_i s_i + z_k \quad \text{[Equation 17]}$$

Here, $$z_k \sim CN\left(0,\ \sigma_k^2\right)$$

means complex Gaussian noise. At this point, the signal-to-interference-plus-noise ratio (SINR) of the signal that user k receives may be expressed as shown in Equation 18.

$$SINR_k = \frac{\left|\left(h_k^{dl}\right)^H f_k\right|^2}{\sum_{i\neq k}\left|\left(h_k^{dl}\right)^H f_i\right|^2 + \sigma_k^2/P} = \frac{\sum_{i=1}^{K} f_i^H h_k^{dl}\left(h_k^{dl}\right)^H f_i + \sigma_k^2/P}{\sum_{i\neq k} f_i^H h_k^{dl}\left(h_k^{dl}\right)^H f_i + \sigma_k^2/P} \quad \text{[Equation 18]}$$

The DL sum-spectral efficiency using the complete channel state information at transmitter (CSIT) is defined as shown in Equation 20.

$$R(f_1, \ldots, f_K) = \sum_{k=1}^{K} \log_2(1 + SINR_k) = \log_2\left(\prod_{k=1}^{K} \frac{\sum_{i=1}^{K} f_i^H h_k^{dl}\left(h_k^{dl}\right)^H f_i + \sigma_k^2/P}{\sum_{i\neq k} f_i^H h_k^{dl}\left(h_k^{dl}\right)^H f_i + \sigma_k^2/P}\right) \quad \text{[Equation 19]}$$

Under the sum-power limitation condition $$\sum_{k=1}^{K} \|f_k\|_2^2 = 1,$$

the sum-spectral efficiency maximization problem is given as shown in Equation 20. The sum-power limitation condition refers to a condition that ensures the transmission power not to exceed the total sum power of antennas in a large MIMO system.

$$\mathfrak{H}^1: \underset{\{f_x\}_{k=1}^{K} \in \mathbb{C}^{N\times 1}}{\operatorname{argmax}} R(f_1, \ldots, f_K) \text{ subject to } \Sigma_{k=1}^{K}\|f_k\|_2^2 = 1 \quad \text{[Equation 20]}$$

In order to solve the sum-spectral efficiency maximization problem of Equation 20, accurate DL channel information $$h_k^{dl}$$

or its external product $$h_k^{dl}\left(h_k^{dl}\right)^H$$

should be known. However, in the case of an FDD system, it is difficult to know the value of exact external product $$h_k^{dl}\left(h_k^{dl}\right)^H,$$

and therefore its approximate value should be used. Equation 21 shows the asymptotic error between the CSIT reconstructed using $$\hat{h}_k^{dl}$$

and $\Phi_k$ and the exact $$h_k^{dl}\left(h_k^{dl}\right)^H$$

when it is assumed that $$\Delta_k = h_k^{dl}\left(h_k^{dl}\right)^H - \left(h_k^{-dl}\left(h_k^{-dl}\right)^H + \Phi_k\right).$$

[Equation 21]

$$\lim_{N\to\infty}\frac{1}{N^2}\|\Delta_k\|_F^2 = \sum_{l\neq l'} 2\left(1+\mathrm{Re}\{\eta\}^4\right)\left|b_{k,l}b_{k,l'}\right|^2 - \sum_{l\neq l'} 4\mathrm{Re}\{\eta\}^2\mathrm{Re}\left\{g_{k,l}^{dl}\left(g_{k,l'}^{dl}\right)^* g_{k,l}^{ul}\left(g_{k,l}^{ul}\right)^*\right\}$$

The embodiment of the present invention provides intuition for the approximate value proposed in Equation 21. The external product of the DL channel is equal to the approximate value described above in the sense of average.

[Equation 22]

$$\mathbb{E}\left[h_k^{dl}\left(h_k^{dl}\right)^H\right] = \mathbb{E}\left[\hat{h}_k^{dl}(\hat{h}_k^{dl})^H + \phi_k\right], \forall_k \in [K]$$

[Equation 23]

$$\mathbb{E}\left[\left[h_k^{dl}\left(h_k^{dl}\right)^H - \hat{h}_k^{dl}(\hat{h}_k^{dl})^H \,\middle|\, h_k^{ul}, \theta_k, \Sigma_k\right]\right] = \mathbb{E}_{h_k^{ul},\theta_k,\Sigma_k}\left[\left(1-\mathrm{Re}\{\eta\}^2\right)A_k^{dl}\Sigma_k\left(A_k^{dl}\right)^H\right] = \mathbb{E}_{h_k^{ul},\theta_k,\Sigma_k}[\Phi_k]$$

As a result, the approximate value proposed in Equation 21 means an unbiased estimation value for $$h_k^{dl}\left(h_k^{dl}\right)^H.$$

In addition, in the case of a single path scenario, the approximate value comes to be accurate asymptotically, and this is specified in Equation 24.

[Equation 24]

$$\lim_{N\to\infty}\frac{1}{N^2}\|\Delta_k\|_F^2 = 0$$

Equation 24 expresses a normalized error when the carrier frequency ratio is changed to verify accuracy of the CSIT approximation.

Figure 7:
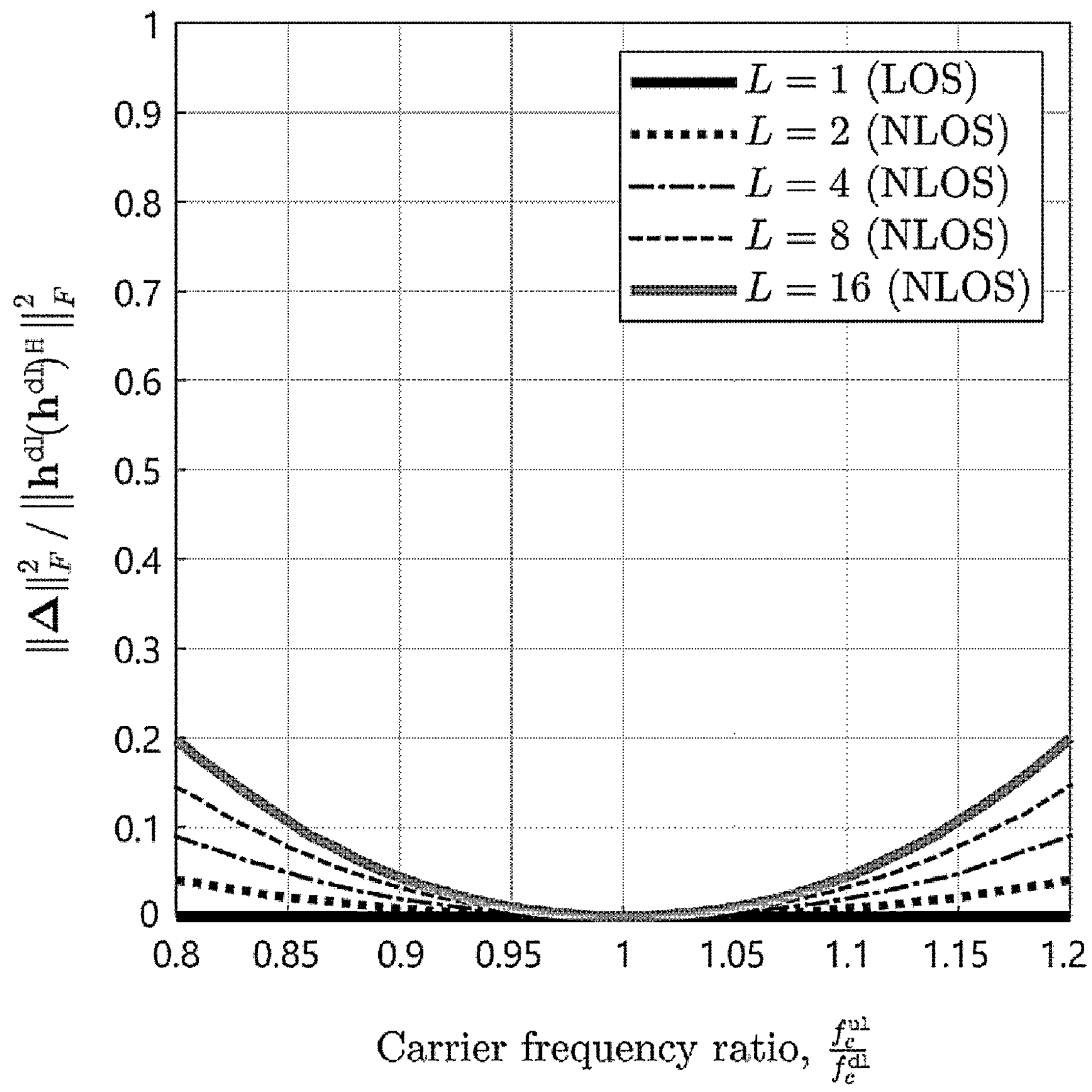
FIG. 7 is a graph showing approximation error as a function of ratio between a UL channel and a DL channel according to the number of channel paths L.

FIG. 7 is a graph showing approximation error as a function of ratio between a UL channel and a DL channel according to the number of channel paths L.

Referring to FIG. 7, when it is assumed that the number of channel paths is L∈{1, 2, 4, 8, 16}, the graph shows that the normalized error increases as the number of channel paths increases, and this means that accuracy of the L channel reconstruction method is lowered. However, as long as the difference between UL and DL frequencies is small, the error remains at a negligible level, so that the value of DL channel external product may be estimated accurately with minimal error.

The DL sum-spectral efficiency function as shown in Equation 25 is derived from Equation 23.

[Equation 25]

$$\hat{R}(f_1, \ldots, f_K) = \log_2\left(\prod_{k=1}\frac{\sum_{i=1}^{K} f_i^H\left(\hat{h}_k^{dl}(\hat{h}_k^{dl})^H + \Phi_k\right)f_i + \frac{\sigma_k^2}{P}}{\sum_{i=k} f_i^H\left(\hat{h}_k^{dl}(\hat{h}_k^{dl})^H + \Phi_k\right)f_i + \frac{\sigma_k^2}{P}}\right)$$

The DL sum-spectral efficiency of Equation 25 is an approximate value that considers the incomplete channel state information at the base station, and the base station optimizes this approximate value function for DL transmission. The sum-spectral efficiency maximization problem is a well-known Nondeterministic Polynomial time (NP) hard problem. The Weighted Minimum Mean Square Error (WMMSE) algorithm is a widely used approach for solving the optimization. Recently, the Greedy Power and Information Precoding (PIP) algorithm is introduced to provide a comprehensive solution for joint user selection, beam forming, and power allocation, and it is appeared as the most effective solution for maximizing the total spectral efficiency regardless of the number of antennas and users. Embodiments of the present invention adopt this approach for robust DL precoding.

The core idea of GPIP is to jointly optimize the precoding vector $\{f_1, \ldots, f_K\}$. To achieve this, in an embodiment of the present invention, the precoding vectors are connected using a high-dimensional optimization variable as shown in Equation 26.

[Equation 26]

$$f = \left[f_1^H, \ldots, f_k^H, \ldots, f_K^H\right]^H \in \mathbb{C}^{NK\times 1}$$

As the expression of the sum spectral efficiency of Equation 25 can be reconstructed as a product of Rayleigh coefficient using the high-dimensional optimization variable, it can be expressed more simply.

[Equation 27]

$$\mathfrak{H}^2: \underset{f\in\mathbb{C}^{NK\times 1}}{\mathrm{argmax}} \prod_{k=1}^{K}\frac{f^H A_k f}{f^H B_k f} \text{ subject to } \|f\|_2^2 = 1$$

Here, $A_k \in \mathbb{C}^{NK \times NK}$ and $\Sigma_k \in \mathbb{C}^{NK \times NK}$ are positive semi-definite block diagonal matrices defined as shown in Equation 28.

$$A_k = I_k \otimes \left(\hat{h}_k^{dl} (\hat{h}_k^{dl})^H + \Phi_k\right) + \frac{\sigma_k^2}{P} I_{NK} \quad \text{[Equation 28]}$$

$$B_k = A_k - 1_k 1_k^T \otimes \left(\hat{h}_k^{dl} (\hat{h}_k^{dl})^H + \Phi_k\right) \quad \text{[Equation 29]}$$

The objective function of Equation 27 is scale-invariant, and this may solve the optimization problem as follows.

$$\mathfrak{H}^3: \underset{f \in \mathbb{C}^{NK \times 1}}{\operatorname{argmax}} \prod_{k=1}^{K} \frac{f^H A_k f}{f^H B_k f} \quad \text{[Equation 30]}$$

In Equation 30, a local optimal solution to the sum-spectral efficiency maximization problem is identified. The following theorem expresses the first and second order optimality conditions.

$$\overline{A}f(f) = \gamma(f)\overline{B}f(f) \quad \text{[Equation 31]}$$

$$\overline{A}(f) = \Sigma_{i=1}^{K}\left(\prod_{k=i} f^H A_k f\right) A_i \text{ and } \overline{B}(f) = \Sigma_{i=1}^{K}\left(\prod_{k=i} f^H B_k f\right) B_i \quad \text{[Equation 32]}$$

The first order optimality condition shows that the stationary point of the optimization problem of Equation 30 can be found by identifying f that satisfies the condition of Equation 31. This condition may be expressed as a generalized eigenvalue problem like $[\overline{B}(f)]^{-1}\overline{A}(f)f = \gamma(f)f$. Here, $\gamma(f)$ is the eigenvalue of $[\overline{B}(f)]^{-1}\overline{A}(f)$, and f is the corresponding eigenvector. The eigenvalue $\gamma(f)$ also corresponds to the objective function of Equation 30. Therefore, in order to maximize this objective function, the first eigenvector corresponding to the first eigenvalue of $[\overline{B}(f)]^{-1}\overline{A}(f)$ should be found.

$$\rho_{min}\left(\Sigma_{i=1}^{K} \frac{A_i^H f^* (f^*)^H A_i}{\left((f^*)^H A_i f^*\right)^2}\right) > \rho_{max}\left(\Sigma_{i=1}^{K} \frac{B_i^H f^* (f^*)^H B_i}{\left((f^*)^H B_i f^*\right)^2}\right) \quad \text{[Equation 33]}$$

When the minimum eigenvalue on the left side comes to be greater than the maximum eigenvalue on the right side according to Equation 33, the curvature direction of stationary point f* that satisfies Equation 31 has a completely negative direction. Through this eigenvalue test, it may be determined whether the solution obtained from Equation 31 is a local optimum or not. The maximum and minimum eigenvalues may be calculated using a power iteration algorithm or an inverse power iteration algorithm.

An embodiment of the present invention presents a computationally efficient algorithm that identifies a solution that satisfies the first and second order optimality conditions derived from Equation 31 and Equation 33. The proposed algorithm iteratively finds the local optimum f*. In each iteration, the algorithm begins with configuring function matrices $\overline{A}(f^{(t-1)})$ and $\overline{B}(f^{(t-1)})$ using $f^{(t-1)}$ obtained from a previous step.

Next, the first eigenvector of $[\overline{B}(f^{(t-1)})]^{-1}\overline{A}(f^{(t-1)})$ is found through a power iteration process. Thereafter, $f^{(t)}$ updated through equation $f^{(r)}=[\overline{B}(f^{(t-1)})]^{-1}\overline{A}(f^{(t-1)})f^{(t-1)}$ can be obtained, and it goes through a normalization process to have a unit power. This iteration process is continued until the objective function satisfies stopping criterion $|\gamma(f^{(t-1)}) - \gamma(f^{(t)})|/\gamma(f^{(t-1)}) \leq \epsilon$ and converges, and here, $\epsilon$ denotes an arbitrary positive constant of a small value. After the objective function converges at t=T, the algorithm examines whether the derived solution $f^{(T)}$ satisfies the second order optimality condition at Equation 33. When the condition is satisfied, it completes with algorithm $f^{(T)}$ (=f*). Otherwise, the series of processes performed before is repeated again with a new starting vector. The entire process is summarized in Algorithm 1.

Hereinafter, the ergodic sum-spectral efficiency achieved by the proposed algorithm is compared with those of existing precoding techniques using a system-level simulation. At this point, the simulation parameters and network topologies are described in detail in Table 1.

TABLE 1

| Parameters | Value |
|---|---|
| BS topology | Single hexagonal cell with ISD 500 m |
| User distribution | Uniform per cell |
| UL carrier frequency | 10 GHZ |
| DL carrier frequency | 12 GHZ = $\left(\frac{f_c^{dl}}{f_c^{ul}} = 1.2\right)$ |
| The number of users K | 16 |
| Noise power | −113 dB |
| Path-loss model | Standard model at TR 38.901 |
| BS/UE height | 32 m/1.5 m |

The simulation in the embodiment of the present invention considers a fixed base station location together with randomly distributed user positions for each scenario. This is to fairly evaluate performance of the algorithm under various network conditions.

Effect of Geometric Parameter Estimation Error

Figure 8:
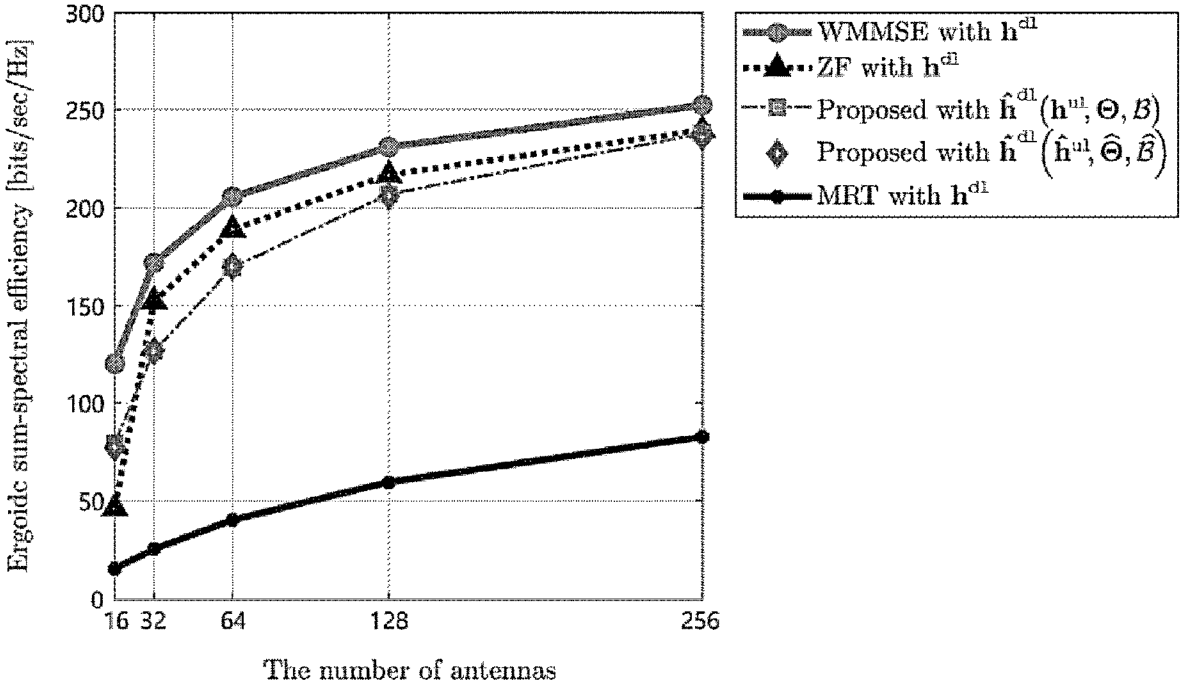
FIG. 8 is a graph showing ergodic sum-spectral efficiency according to increase in the number of antennas.

FIG. 8 is a graph showing ergodic sum-spectral efficiency according to increase in the number of antennas.

Referring to FIG. 8, when it is assumed that the number of channel paths L and the number of users K are (L, K)=(3, 16), the graph shows that the ergodic sum-spectral efficiency increases as the number of antennas increases. The proposed algorithm is configured of two scenarios of perfect knowledge $$\{h_k^{ul}, \theta_k, \Sigma_k\}$$

of geometric parameters and imperfect knowledge $$\{\hat{h}_k^{ul}, \hat{\theta}_k, \hat{\Sigma}_k\}$$

estimated through spatial smoothing and least squares estimation. The result shows that the proposed algorithm achieves zero-forcing (ZF) using perfect CSIT of DL and ergodic sum-spectral efficiency of WMMSE. When evaluation is performed using estimated geometric parameters, performance degradation occurs due to the estimation error, but it can be confirmed that this is ignorable.

Effect of CSIT Knowledge and Precoding

Figure 9:
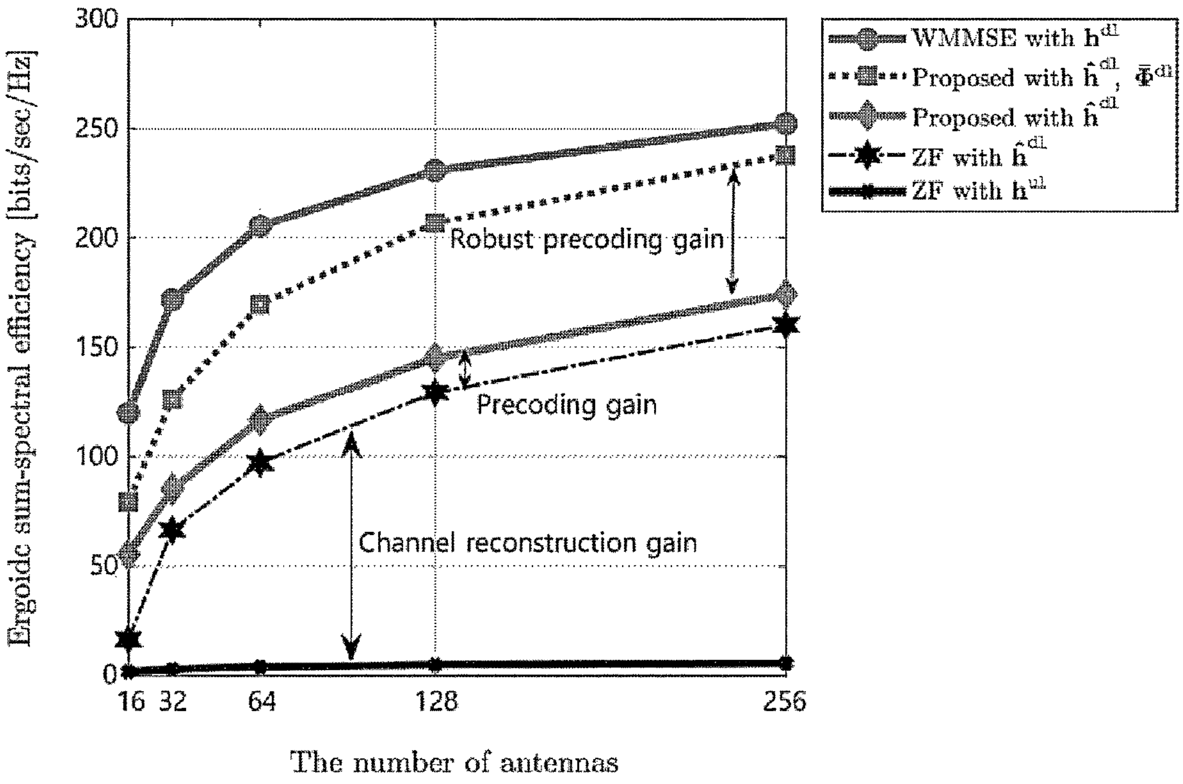
FIG. 9 is a graph showing ergodic sum-spectral efficiency according to CSIT knowledge and precoding strategy.

FIG. 9 is a graph showing ergodic sum-spectral efficiency according to CSIT knowledge and precoding strategy.

Referring to FIG. 9, when it is assumed that the number of channel paths L and the number of users K are (L, K)=(3, 16), the graph shows that after ZF precoding with perfect knowledge of the UL channel is displayed as a benchmark, ZF precoding using a DL channel reconstructed from the UL channel is performed. Effectiveness of the DL channel reconstruction method is proved as the performance is greatly improved. The proposed GPIP technique outperforms the ZF precoding of the two cases mentioned above when precoding is optimized using knowledges of the reconstructed DL channel. When both the DL channel knowledge and the DL channel covariance are used, the proposed algorithm greatly improves the sum-spectral efficiency, and the performance gap with the MMSE decreases as the number of antennas increases.

Effect According to Number of Channel Paths

Figure 10:
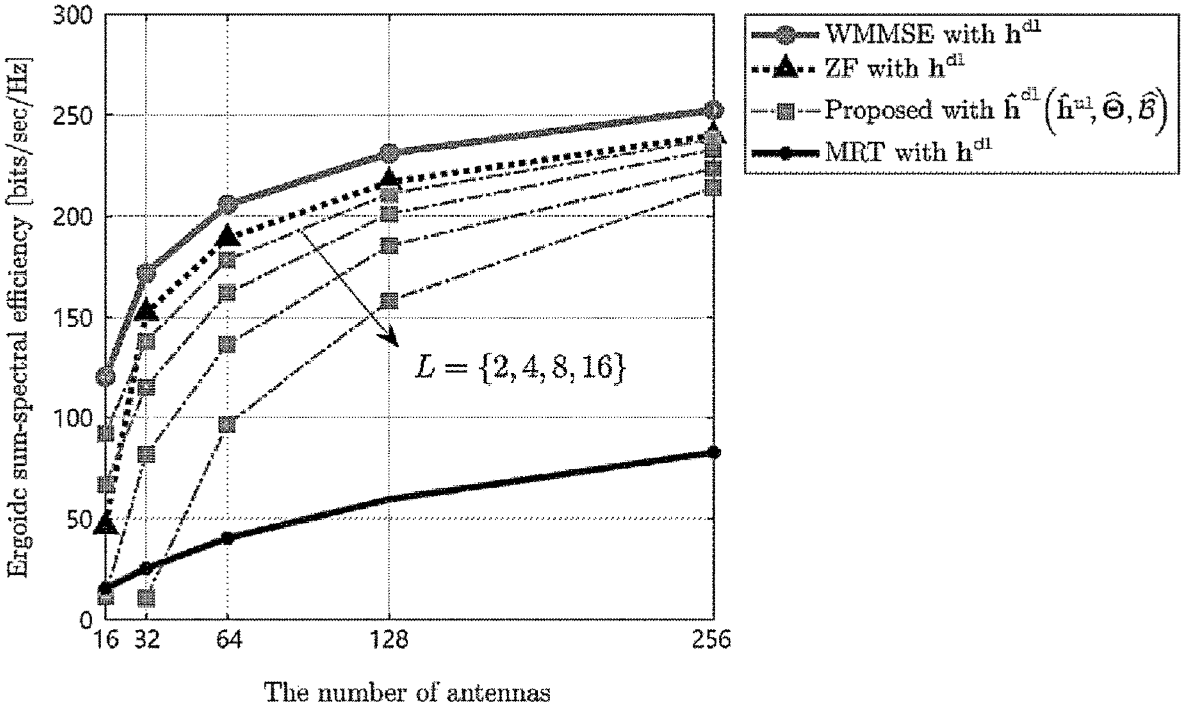
FIG. 10 is a graph showing ergodic sum-spectral efficiency according to increase in the number of channel paths.

FIG. 10 is a graph showing ergodic sum-spectral efficiency according to increase in the number of channel paths.

Referring to FIG. 10, when it is assumed that the number of users is K=16, the graph shows that the ergodic sum-spectral efficiency is lowered as the number of user paths increases. At this point, the simulation is performed on the assumption that the number of channel paths is L={2, 4, 8, 16}. As the number of paths increases, two algorithmic problems occur. That is, performance of DL channel reconstruction is lowered as the estimation error of the geometric parameters increases, and the robust precoding gain is reduced as the orthogonality of the spatial area is lowered. In this viewpoint, the simulation result shows robustness of the proposed algorithm with respect to both the channel reconstruction error and N/L.

As can be confirmed in FIG. 10, the proposed algorithm maintains robustness even in the case of exceeding 16, which corresponds to N/L=256/16.

Convergence Characteristics

Figure 11:
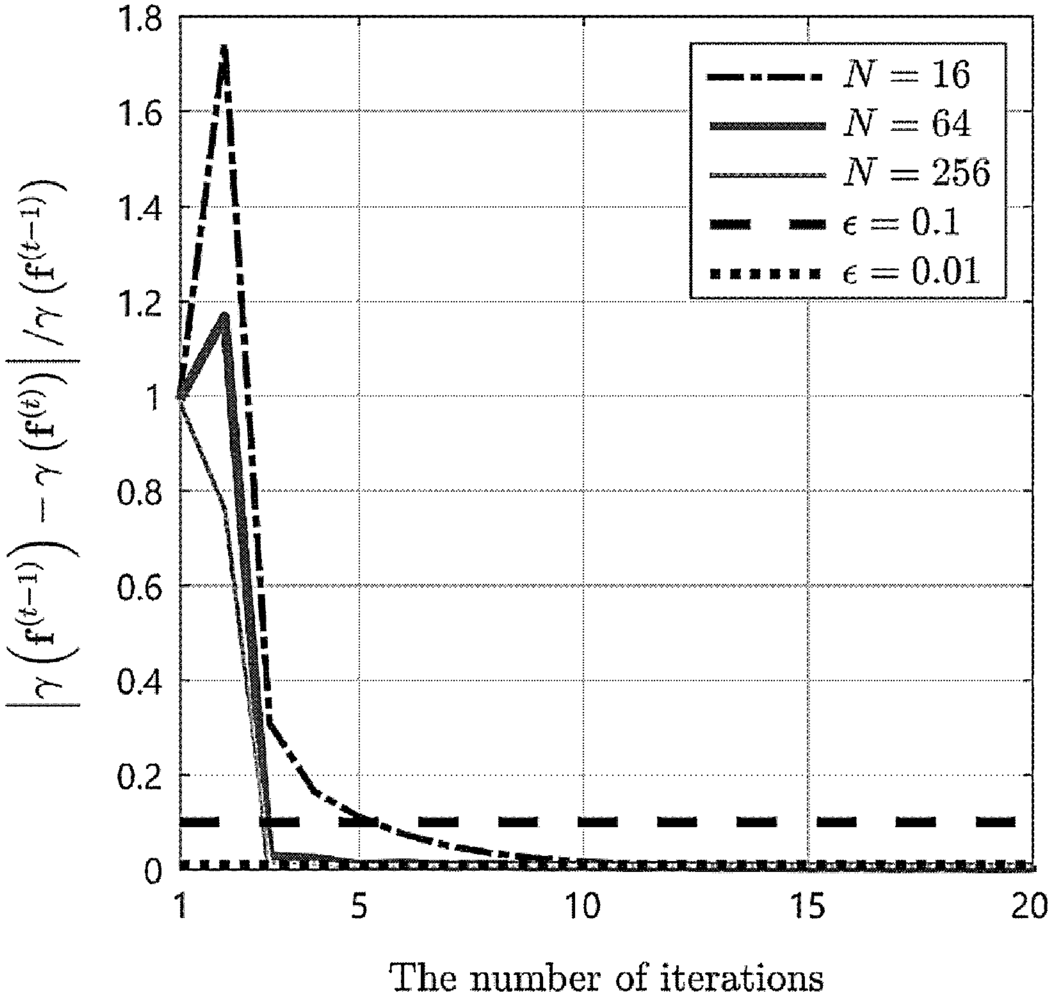
FIG. 11 is a graph showing convergence speed of an algorithm according to an embodiment of the present invention.

FIG. 11 is a graph showing convergence speed of an algorithm according to an embodiment of the present invention.

Referring to FIG. 11, the embodiment of the present invention focuses on determining the number of iterations needed to satisfy the stopping criterion in increasing the number of base station antennas. That is, in the environment of $N \in \{16, 64, 256\}$, the proposed algorithm only needs to be repeated 5 times to reach the desired precision of $\epsilon=0.1$ as shown in the graph. The maximum number of iterations needed to achieve $\epsilon=0.01$ is 10, and it shows fast convergence speed for the proposed algorithm.

According to one aspect of the present invention described above, as the present invention provides a base station that reconstructs a DL channel using a UL pilot signal without separate feedback information and a DL channel reconstruction method using the same, there is an effect of eliminating overheads related to feedback.

In addition, as the frequency-independent parameters commonly used in UL channels and DL channels are extracted from UL channel information and used for DL channel estimation, a DL channel further closer to the actual channel can be reconstructed, and thus, there is an advantage of providing reliable communication through stable data transmission by providing robust precoding.

The DL channel reconstruction method proposed in the present invention as described above may be implemented in the form of program instructions that can be executed through various computer components and recorded in a computer-readable recording medium. The computer-readable recording medium may store program instructions, data files, data structures, and the like alone or in combination.

The program instructions recorded in the computer-readable recording medium may be specially designed and configured for the present invention or may be known to and used by those skilled in the field of computer software.

Examples of the computer-readable recording medium include magnetic media such as hard disks, floppy disks, and magnetic tapes, optical media such as CD-ROMs and DVDs, magneto-optical media such as floptical disks, and hardware devices specially configured to store and execute program instructions, such as ROM, RAM, flash memory, and the like.

Examples of the program instructions include high-level language codes that can be executed by a computer using an interpreter or the like, as well as machine language codes such as those produced by a compiler. The hardware devices described above may be configured to operate as one or more software modules to perform the processes according to the present invention, and vice versa.

Although various embodiments of the present invention have been shown and described above, the present invention is not limited to the specific embodiments described above, and of course, various modified embodiments are possible by those skilled in the art without departing from the gist of the present invention claimed in the claims, and these modified embodiments should not be individually understood from the technical spirit or prospect of the present invention.

DESCRIPTION OF SYMBOLS

100: MIMO communication system
110: Base station
120: UE
115: Control unit

What is claimed is:

1. A method of reconstructing a downlink (DL) channel by a base station in a multiple-input-multiple-output (MIMO) communication system, the method comprising:

estimating uplink (UL) channel information on a UL channel, based on an uplink (UL) pilot signal received from a user equipment;

extracting at least one key parameter having a frequency-independent characteristic among common parameters of the UL channel and the DL channel from the estimated UL channel information;

estimating DL channel information based on the estimated UL channel information and the at least one key parameter; and reconstructing the DL channel by correcting an error between the estimated DL channel information and actual DL channel information, wherein the at least one key parameter includes at least one of an angle of departure parameter, an angle of arrival parameter, and a channel path attenuation parameter, wherein the estimating the DL channel information includes estimating the DL channel information by applying a Minimum Mean Square Error (MMSE) method, wherein the DL channel information is estimated based on:

the estimated UL channel information, a UL array response matrix defined by the angle of arrival parameter, a correlation matrix defined by the channel path attenuation parameter, and a DL array response matrix defined by the angle of departure parameter.

2. The method according to claim 1, further comprising:

performing DL precoding, based on information on the reconstructed DL channel, on a DL signal; and transmitting the pre-coded DL signal.

3. A method of reconstructing a downlink (DL) channel by a base station in a multiple-input-multiple-output (MIMO) communication system, the method comprising: estimating uplink (UL) channel information on a UL channel, based on an uplink (UL) pilot signal received from a user equipment;

extracting at least one key parameter having a frequency-independent characteristic among common parameters of the UL channel and the DL channel from the estimated UL channel information;

estimating DL channel information based on the estimated UL channel information and the at least one key parameter; and reconstructing the DL channel by correcting an error between the estimated DL channel information and actual DL channel information, wherein the at least one key parameter includes at least one of an angle of departure parameter, an angle of arrival parameter, and a channel path attenuation parameter, wherein the estimating the DL channel information includes estimating the DL channel information by applying a Linear-Minimum Mean Square Error (L-MMSE) method, and wherein the DL channel information is estimated based on:

the estimated UL channel information, a UL array response matrix defined by the angle of arrival parameter, a DL array response matrix defined by the angle of departure parameter, and a real part of a carrier normalization constant.

4. The method according to claim 1, wherein the error between the estimated DL channel information and the actual DL channel information is corrected using an error covariance matrix, and the error covariance matrix for the DL channel information estimated by applying the MMSE method is derived based on the angle of departure parameter, a channel path attenuation matrix, a scaling parameter, and the DL array response matrix defined by the angle of departure parameter.

5. The method according to claim 3, wherein the error between the estimated DL channel information and the actual DL channel information is corrected using an error covariance matrix, and the error covariance matrix for the DL channel information estimated by applying the L-MMSE method is derived based on the angle of departure parameter, a channel path attenuation matrix, a scaling parameter, the DL array response matrix defined by the angle of departure parameter, and the real part of the carrier normalization constant.

6. A base station for reconstructing a downlink (DL) channel in a multiple-input-multiple-output (MIMO) communication system, the base station comprising:

a reception unit configured to receive an uplink (UL) pilot signal transmitted from a user equipment;

a UL channel information estimation unit configured to estimate UL channel information on a UL channel, based on the received UL pilot signal;

a parameter extraction unit configured to extract at least one key parameter having a frequency-independent characteristic among common parameters of the UL channel and the DL channel from the estimated UL channel information;

a DL channel information estimation unit configured to estimate DL channel information using the estimated UL channel information and the at least one key parameter; and a DL channel reconstruction unit configured to reconstruct the DL channel by correcting an error between the estimated DL channel information and actual DL channel information, wherein the at least one key parameter includes at least one of an angle of departure parameter, an angle of arrival parameter, and a channel path attenuation parameter, wherein the DL channel information estimation unit is configured to estimate the DL channel information by applying a Minimum Mean Square Error (MMSE) method, wherein the DL channel information estimation unit is configured to estimate the DL channel information based on:

the estimated UL channel information, a UL array response matrix defined by the angle of arrival parameter, a correlation matrix defined by the channel path attenuation parameter, and a DL array response matrix defined by the angle of departure parameter.

7. The base station according to claim 6, further comprising:

a DL precoding unit configured to perform DL precoding, based on information on the reconstructed DL channel, on a DL signal; and a transmission unit configured to transmit the pre-coded DL signal.

8. A base station for reconstructing a downlink (DL) channel in a multiple-input-multiple-output (MIMO) communication system, the base station comprising:

a reception unit configured to receive an uplink (UL) pilot signal transmitted from a user equipment;

a UL channel information estimation unit configured to estimate UL channel information on a UL channel, based on the received UL pilot signal;

a parameter extraction unit configured to extract at least one key parameter having a frequency-independent characteristic among common parameters of the UL channel and the DL channel from the estimated UL channel information;

a DL channel information estimation unit configured to estimate DL channel information using the estimated UL channel information and the at least one key parameter; and a DL channel reconstruction unit configured to reconstruct the DL channel by correcting an error between the estimated DL channel information and actual DL channel information, information, wherein the at least one key parameter includes at least one of an angle of departure parameter, an angle of arrival parameter, and a channel path attenuation parameter, wherein the DL channel information estimation unit is configured to estimate the DL channel information by applying a Linear-Minimum Mean Square Error (L-MMSE) method, wherein the DL channel information estimation unit is configured to estimate the DL channel information is estimated based on:

the estimated UL channel information, a UL array response matrix defined by the angle of arrival parameter, a DL array response matrix defined by the angle of departure parameter, and a real part of a carrier normalization constant.

9. The base station according to claim 6, further comprising:

an error covariance matrix deriving unit configured to derive an error covariance matrix for correcting the error between the estimated DL channel information and the actual DL channel information, wherein the error covariance matrix deriving unit is configured to derive the error covariance matrix for the DL channel information, estimated by applying the MMSE method, based on:

the angle of departure parameter, a channel path attenuation matrix, a scaling parameter, and the DL array response matrix defined by the angle of departure parameter.

10. The base station according to claim 8, further comprising:

an error covariance matrix deriving unit configured to derive an error covariance matrix for correcting the error between the estimated DL channel information and the actual DL channel information, wherein the error covariance matrix deriving unit is configured to derive the error covariance matrix for the DL channel information, estimated by applying the L-MMSE method, based on:

the angle of departure parameter, a channel path attenuation matrix, a scaling parameter, the DL array response matrix defined by the angle of departure parameter, and the real part of the carrier normalization constant.

* * * * *